(12) United States Patent
Spencer et al.

(10) Patent No.: US 8,914,744 B2
(45) Date of Patent: Dec. 16, 2014

(54) ENHANCED ZOOM AND PAN FOR VIEWING DIGITAL IMAGES

(75) Inventors: Marc D. Spencer, Bedford, MA (US); Stephen H. Kristy, Fairport, NY (US); Maikel Francois Pierre Brands, Amsterdam (NL)

(73) Assignee: LiquidPixels, Inc., Fairport, NY (US)

(*) Notice: Subject to any disclaimer, the term of this patent is extended or adjusted under 35 U.S.C. 154(b) by 595 days.

(21) Appl. No.: 12/480,641

(22) Filed: Jun. 8, 2009

(65) Prior Publication Data

US 2010/0115462 A1  May 6, 2010

Related U.S. Application Data

(60) Provisional application No. 61/059,329, filed on Jun. 6, 2008.

(51) Int. Cl.
| | |
|---|---|
| *G06F 3/048* | (2013.01) |
| *G06F 3/14* | (2006.01) |
| *G06F 17/30* | (2006.01) |
| *G09F 23/00* | (2006.01) |

(52) U.S. Cl.
CPC ............ *G06F 3/14* (2013.01); *G06F 17/30038* (2013.01); *G09F 23/00* (2013.01); *G09G 2340/0407* (2013.01); *G09G 2340/0464* (2013.01); *G09G 2370/027* (2013.01)
USPC ....................................................... 715/800

(58) Field of Classification Search
USPC ......... 715/800, 764, 765, 767, 788, 792, 801, 715/815
See application file for complete search history.

(56) References Cited

U.S. PATENT DOCUMENTS

| | | | |
|---|---|---|---|
| 5,652,887 A | 7/1997 | Dewey et al. | |
| 6,144,797 A | 11/2000 | MacCormack et al. | |
| 6,356,283 B1 * | 3/2002 | Guedalia ....................... | 715/760 |
| 6,496,849 B1 | 12/2002 | Hanson et al. | |
| 6,523,063 B1 | 2/2003 | Miller et al. | |
| 6,754,785 B2 | 6/2004 | Chow et al. | |
| 6,816,907 B1 | 11/2004 | Mei et al. | |
| 6,964,009 B2 | 11/2005 | Samaniego et al. | |
| 7,109,985 B2 | 9/2006 | Spencer et al. | |
| 2001/0044805 A1 | 11/2001 | Multer et al. | |
| 2002/0099911 A1 | 7/2002 | Mund et al. | |

(Continued)

OTHER PUBLICATIONS

"Internet Imaging Protocol," Version 1.0, Mar. 27, 1997, Hewlett Packard Company, Live Picture, Inc. and Eastman Kodak Company, pp. i-vi and 7-74. Cited in U.S. Appl. No. 11/472,914. See USPGP Cite 1.

*Primary Examiner* — Anil Bhargava
(74) *Attorney, Agent, or Firm* — Rossi, Kimms & McDowell LLP

(57) ABSTRACT

A system and method is provided that generates and transmits images over a communication network to an end user. The system and method includes a zoom and pan (ZAP) feature that offers a user the ability to see all available detail of a displayed image despite the limited image display area. Specifically, images presented within a zoom and pan interface allow the user to zoom in to a particular area of a displayed image to see additional detail, pan to view various areas of the displayed image, and to zoom out again to view the whole displayed image in context. The ZAP feature is applied to a dynamically generated image that includes at least one dynamic image feature, and viewing-region-tracking information is generated enabling user viewing characteristics to be tracked and analyzed.

3 Claims, 12 Drawing Sheets

(56) References Cited

U.S. PATENT DOCUMENTS

| | | |
|---|---|---|
| 2002/0120650 A1 | 8/2002 | d'Aquin |
| 2003/0018732 A1 | 1/2003 | Jacobs et al. |
| 2004/0054542 A1* | 3/2004 | Foote et al. .................... 704/500 |
| 2004/0078491 A1* | 4/2004 | Gormish et al. .............. 709/247 |
| 2006/0170693 A1* | 8/2006 | Bethune et al. ................ 345/568 |
| 2006/0197781 A1* | 9/2006 | Arutunian ...................... 345/629 |
| 2006/0238547 A1* | 10/2006 | Spencer et al. ................ 345/619 |
| 2006/0267982 A1* | 11/2006 | Aguera y Arcas ............ 345/428 |
| 2007/0036462 A1* | 2/2007 | Crandall et al. .............. 382/284 |
| 2007/0258569 A1 | 11/2007 | Spencer |
| 2009/0037838 A1* | 2/2009 | Gedye et al. ................... 715/777 |

* cited by examiner

ENHANCED ZOOM AND PAN FOR VIEWING DIGITAL IMAGES

CROSS-REFERENCE TO RELATED APPLICATION

The present application claims priority from U.S. Provisional Patent Application 61/059,329, filed Jun. 6, 2008, the contents of which are incorporated herein by reference.

FIELD OF THE INVENTION

The invention relates in general to a system and method for providing digital images over a communication network to an end user. More specifically, the invention relates to a system and method for providing digital images over a communication network, in which a zoom and pan feature is provided to enable a user to isolate and expand selected areas of a dynamically generated image incorporating dynamic imaging features, and further enables the tracking of user viewing characteristics, including zoom and pan operations, related to an individual user or a group of users.

BACKGROUND OF THE INVENTION

The establishment of the Internet has enabled the average individual to retrieve and manipulate vast amounts of information from sources throughout the world. In the beginning, the Internet was primarily used to transfer information in the form of text data due to limitations in the technology associated with the capture, storage, manipulation and transfer of digital images over the Internet. These limitations included, for example, the expense of electronic imaging equipment and electronic memory devices, limited computer processing speeds, and the limited data transfer rates associated with available communication networks.

As technology has progressed, however, many of the limitations associated with the transmission of digital images described above have been overcome. The average home computer, for example, is now equipped with sufficient processing speed and memory to easily store and manipulate large numbers of high resolution digital images. Data transfer rates have also dramatically improved through the use of high speed DSL, fiber optic networks, cable modems and satellite links. Further, advances in image capture technologies have also lowered the price of digital cameras and digital scanners to such a degree that conventional silver halide imaging has essentially been rendered obsolete in the mass consumer market. Even the lowest priced electronic cameras and cellular telephones employ images sensors having resolutions unobtainable in the mass consumer market just a decade ago. The overall result of these technological advances has been an explosion in the use of digital images to convey information worldwide over the Internet.

In particular, the use of digital images to display products in electronic commerce applications has become a critical factor in the success of companies utilizing electronic commerce sites to sell products over the Internet. While early electronic commerce sites were basically limited to text descriptions of the products being offered for sale, it quickly became apparent that consumers would hesitate to buy a large number of products—for example clothing—unless the consumer could actually see what they were buying. Accordingly, electronic commerce sites began to include digital images of their products which could be viewed by the user prior to purchase.

It further became apparent that sales could be increased if consumers could make requests to change a displayed image. For example, the consumer may wish to change the size of the image being displayed, change the color of the item being displayed or may wish to display two items together in a specific combination related to the user's own tastes. Alternatively, the consumer may wish to add something to the image in order to customize the item being purchased. A typical example of such customization would be allowing the consumer to add a name on the back of a sports jersey.

The basic infrastructure of the Internet, however, was not originally developed to allow for dynamically creating, manipulating and transferring digital images on a per request basis in an efficient manner, in which the composition, format, presentation, and content of the digital images could be determined by directives presented at the time of a request generated by a user. Instead, conventional technologies and protocols at that time required each potentially desired digital image be separately created and maintained on an image server. As a result, a great deal of resources, both in human development time and electronic image storage capability, were required to create and maintain digital images on electronic commerce servers, which greatly increased the expense of utilizing digital images in electronic commerce applications.

In order to overcome these problems, LiquidPixels, Inc. of Fairport, N.Y. developed and implemented a novel technology, referred to as LiquiFire™, that allows users to dynamically create and manipulate images on demand and in real time. The technology employs a system and method to perform dynamic imaging operations in response to commands received from a user. The technology developed by LiquidPixels, Inc, is described in detail in U.S. Pat. No. 7,109,985, the content of which is incorporated herein by reference. With the development of the LiquiFire™ technology, it is now possible to generate digital images on the fly in response to a user's request.

In a specific implementation, the LiquiFire™ system and method includes a parser that takes a request and interprets it into a set of individualized operation commands that will, in sequence, be performed to create or alter an image. Each command, for example, may indicate a source for image data to be acquired, perform an image manipulation on a previously acquired image (including such operations as composition, text, drawing, filtering, etc.), modify the state of the request to provide information which may be used by commands later in the request (by performing calculations, database queries, time decisions, if decisions, etc), perform mathematical or positional calculations, create a new image based on data, or indicate disposition of the image. The commands derived from the parser are defined as a "job", namely, a job is composed of a list of commands that will be performed in sequence, and represents the sequential collection of commands that were parsed from the data presented in the request. One or more image processing engines may be called upon as the job is processed to perform requested image transformations. These engines may be added to over time to allow for extension and customization of the system. An output formatter takes the resulting processed image and converts it to the desired format stated in the request received from the end user.

The LiquiFire™ system and method can be utilized in a number of different applications. For example, the system and method can be utilized to create advertisements (visual or audible) targeted for a specific recipient, utilizing information about that recipient to drive the creation or modification of the advertisement in such areas as: Internet radio advertising and building on-the-fly audio streams; Interactive TV and building on-the-fly commercials on a per viewer basis; direct marketing print advertising; and direct marketing HTML email advertising wherein an e-mail sent to a recipient includes images related to product advertisements and allows the customer to dynamically alter the images in order to customize the product being purchased. The type of information known about the recipient can be specific (such as favorite ice cream, current salary, etc.), but may also be as simple as what time zone the recipient is in or what time are they viewing the advertisement.

The system and method can also be utilized to insert data into a pre-existing or in on-the-fly generated image or graphic templates for the purpose of enticing a viewer into pursuing additional information about a product or service. Examples include: inserting up-to-the-second stock quotes into an ad that is advertising a financial services company; inserting up-to-the-second sports scores into an ad which is advertising sporting goods (note that the specific sports selected to display could be driven by information about the viewer); inserting up-to-the-second pricing information regarding an ongoing sale or auction; combining images or graphics in order to create a new image for the purpose of enticing a viewer into pursuing additional information about a product or products. Examples of combining images include: combining any viewer selected necktie on to any viewer selected shirt; creating an image of a piece of furniture upholstered in any viewer selected fabric/pattern; creating an image of a house by combining photos of siding, shutters, doors and viewer selected color schemes.

Regardless of the specific application, digital images embedded within an Internet Web page or any other interactive medium require a tradeoff between the size of the digital image and the amount of visible detail available. Image display real estate—the area available to place an image on a page—is always limited, which results in the limitation of the size of the displayed digital image and the amount of detail that can be provided in the displayed digital image. Accordingly, it would be desirable to provide a feature to the user that would allow the user, under the user's control, to view all areas of the displayed digital image in greater detail. Further, given that the area of interest within an image can represent important information to a marketer, it would also be desirable to be able to determine and track which areas of the displayed image were of particular interest to a user or how the user interacted with the displayed image.

SUMMARY OF THE INVENTION

In view of the above, the present invention provides a system and method that generates and transmits images over a communication network to an end user. The system and method includes a zoom and pan (ZAP) feature that offers a user the ability to see all available detail of a displayed image despite the limited image display area. Specifically, images presented within a zoom and pan interface allow the user to zoom in to a particular area of a displayed image to see additional detail, pan to view various areas of the displayed image, and to zoom out again to view the whole displayed image in context. The ZAP feature is utilized in cooperation with a dynamically generated image.

The areas of the displayed image that are viewed by a user are preferably completely under that user's control with the ZAP feature. This provides another benefit to the user, namely, the ability to view parts of a large displayed image that are interesting to the user. For example, consider a picture of a bedroom with bedroom furniture, bed linens, throw pillows, and several pieces of framed artwork. Viewing this image via ZAP allows the user to explore the elements that are of interest, without sacrificing detail. If one user is shopping for framed artwork, that user can zoom in to one or more of the pieces of framed artwork. Another user, however, interested in linens, may zoom in to the detail of the fabric used on the bed. A third may be looking to purchase furniture. Given that different users may be interested in different areas of a displayed image, recording the specific areas viewed by different users can provide deep insights as to what elements of an image are interesting to a specific individual user or to a group of users having the same demographics.

The present invention includes at least two additional enhancements to a basic ZAP user-interface in order to provide additional capabilities and advantages to a user, namely, the ability to utilize a ZAP feature with a dynamically generated image and the addition of viewing-region-tracking. The enhancements are implemented, for example, in a dynamic imaging server of the type described in the above-described U.S. Pat. No. 7,109,985 or related U.S. patent application Ser. Nos. 11/472,914 and 11/778,443, the content of each of which is incorporated herein by reference, although the invention is applicable to any dynamically generated image regardless of how the image is produced.

In particular, the invention provides a ZAP feature that can be implemented with a dynamically generated image that includes a dynamic image features such as a hotspot. A hotspot, for example, is a region of a dynamically generated image identified as a particular area of interest. This identification may be done before presentation via a ZAP viewer or they may be dynamically created or altered over time. In either case, each region is represented as coordinate-based shape. For example, regions may be polygons, represented as series of coordinate-pairs, or as bezier curves, represented as a series of handle locations. Each region may have one or more corresponding actions. The selection of one of the actions for a region is determined by a user interface, for example, by a "click" on the hotspot by a selection interface device such as a computer mouse or the selection of a menu item (for multiple actions per region) visually corresponding to the region. The actions may include, but are not limited to, instructing the viewer to change a viewport (an area within a displayed page used to view the image) to a pre-defined location, changing the image being viewed, recording the selection of the region, reporting back to a centralized server or navigating a browser to a URL. For example, one may be viewing a wrist watch in a zoom and pan window while clicking on a hotspot changes the view of the image to a different region on the wrist watch.

As a user interacts with a ZAP feature, the user may zoom-in multiple times, pan the image at it's current level of detail, and zoom-out. Initially, the image is viewed in its entirety, the visible region or viewport, encompassing the entirety of the image. As the user navigates the image, each zoom-in operation reduces the area encompassed by the viewport, and each zoom-out operation increases the area encompassed by the viewport. Panning operations move the viewport without changing its size. As the viewport changes, the size and location of the viewport is recorded and subsequently conveyed back to a central server, thereby resulting in a list of viewport locations, the time of the viewport change, the type of change made to the viewport and an identifier for the user or session. As the collection of viewport coordinates increases, this information contains the areas of an image which are 'important' both to an individual user, and/or to various groups of users, depending on how and if user identification is handled. This "viewing-region-tracking" information can be particularly valuable as a marketing tool to determine which types of images and which objects within images generate the most interest to viewers, and can also be played back for future analysis of the user's entire viewing session.

In a preferred embodiment, for example, the present invention provides a system and method for providing images that includes a ZAP feature. In operation, an original displayed image is broken up into a series of regularly sized rectangles forming a grid along the entire image. The size of the sections may be fixed, or they may grow and shrink based on how much viewport data is available. The grid of rectangles is overlaid on top of the original image. As different sections are selected by a user, each viewport record is recorded by the dynamic imaging server used to generate the images. The recorded viewpoint records can be used to darken the color of the grid cells that it contains (and partially darken the cells it partially contains, proportional to the amount of overlap) in order to generate a "heat map" of the areas on the image that were viewed. Further, color may be applied to the heat map to indicate various characteristics of the viewport or of the viewing session. For example, the selection of hotspots could result in color being applied to the grid rectangles where the click and/or viewport was located, so the original image is still viewable under the heat map, i.e., the heat map is semi-transparent overlay.

The basic system includes a dynamic imaging server that creates a dynamically generated image including a least one dynamic image feature, and a network appliance that allows a user to generate image requests including a zoom-and-pan command. The dynamic imaging server modifies the dynamically generated image in response to the zoom-and-pan command to create a modified image. As stated above, the dynamic imaging feature preferably includes a hot spot incorporated in the dynamically generated image. Further, the dynamic imaging server generates tracking information corresponding to the image request generated by the network appliance. As describe above, the tracking information is preferably used to generate a heat map that graphically illustrates user viewing characteristics, including, for example, areas of particular interest to the user in the dynamically generated image created by the dynamic imaging server.

Further, in a preferred embodiment, the dynamic imaging server performs auto-tiling of the dynamically generating image in response to the zoom-and-pan command, by generating a plurality of tile layers corresponding to the dynamically generated image. Each of the plurality of tile layers is generated at a different resolution, and includes a plurality of individual image tiles. When a user selects a specific portion of an image to be expanded, the dynamic imaging server selects corresponding individual tiles from a tile layer of higher resolution for display.

The invention is not limited to the specific preferred embodiments mentioned above or described in greater detail below. Other variations, modifications, advantages and embodiments will become apparent to those skilled in the art based on the following detailed description of the preferred embodiments

BRIEF DESCRIPTION OF THE DRAWINGS

The invention will be described in detail with reference to certain preferred embodiments thereof along with the accompanying drawings, wherein.

DETAILED DESCRIPTION OF THE PREFERRED EMBODIMENTS

The present invention is directed to a system and method that generates and transmits digital image over a communication network to an end user. The system and method includes a zoom and pan (ZAP) feature that offers a user the ability to see all available detail of a displayed image despite the limited image display area. Specifically, images presented within a zoom and pan interface allow the user to zoom in to a particular area of a displayed image to see additional detail, pan to view various areas of the displayed image, and to zoom out again to view the whole displayed image in context. Dynamic imaging features, such as hotspots, can be incorporated with the ZAP feature, the selection of which causes a further action to occur, and viewing-region-tracking which tracks and reports the locations within an image that are viewed by the user.

Figure 1:
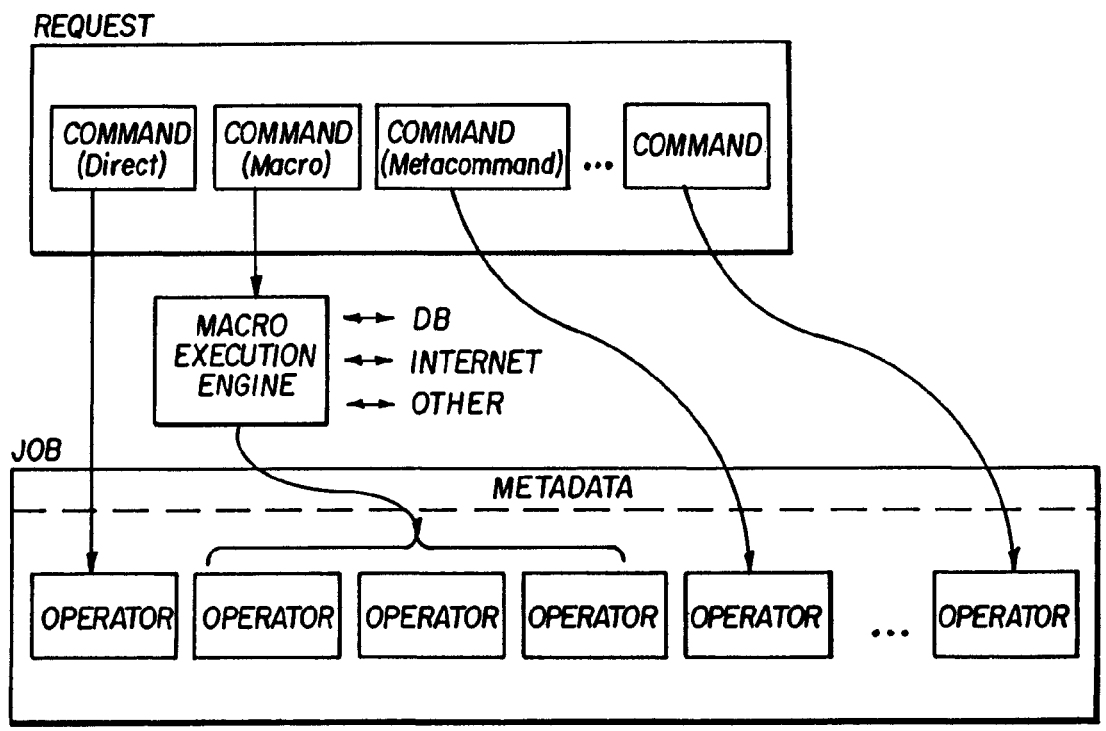
FIG. 1 is a schematic block diagram illustrating command processing in accordance with the present invention.
Figure 2:
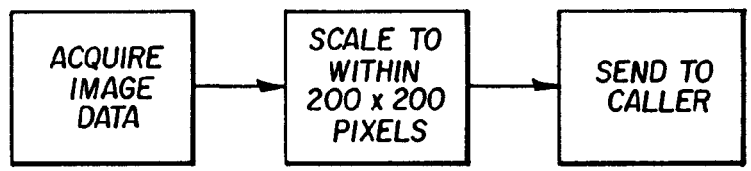
FIG. 2 is a schematic block diagram illustrating a request supplied to a dynamic imaging server of the type illustrated in FIG. 1.

The preferred embodiments of the invention will be described with reference to a dynamic imaging server of the type described in U.S. Pat. No. 7,109,985 discussed above. FIG. 1 is a basic block diagram illustrating the command processing structure used to execute commands by a dynamic imaging server in accordance with the present invention. As one simple example, consider the display of an image in a web page within a space two hundred pixels wide and two hundred pixels tall. There are three steps required to process the image: 1) acquire the source image; 2) scale it to the desired size, and 3) send it to the requesting browser in a format the browser understands. These steps are graphically illustrated in FIG. 2, and will result in the creation of a single operator in the image chain as illustrated in FIG. 3.

Image chains themselves are not directly created. Rather, they are represented as a sequence of commands, each with a list of optional arguments. Each command represents one or more operators, macros or metacommands. These commands, in turn, are interpreted to create the image chain. Image chains can be represented in many different ways including, but not limited to, http or xml.

Figure 3:
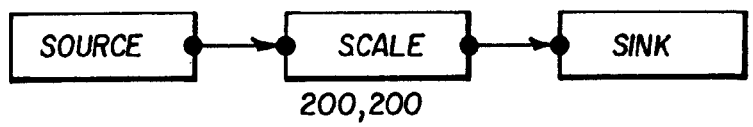
FIG. 3 is a schematic block diagram illustrating an image chain that results from the request illustrated in FIG. 2.

The example depicted in FIG. 3 contains three operators, with the second having two arguments, width and height. This example can be represented with three corresponding commands in an http request. The http syntax for the system is designed to be simple to read and develop. For the technically inclined, the Modified Backus-Nauer form (mBNF) of the http request is listed in the Appendix provided in U.S. Pat. No. 7,109,985 B2 (hereinafter "the Appendix") under "HTTP Syntax Definition", at 187.

Commands are identified by name, and may result in one or more (as in the case of a macro) operators being added to the image chain. Optional named arguments begin with an equals sign '=' and are separated by commas ',' with their values surrounded by square brackets ('[' and ']'). Commands may have zero or more arguments.

commandName=argumentName[value],anotherArg[AnotherValue] . . . .

The illustrated embodiment will focus solely on the http representation of system requests. It will be understood, however, that other formats are possible. In the http request form, commands are processed sequentially, and are separated in the request by an ampersand character '&' as per the http standard for get requests:

commandOne=argOne[valueOne],argTwo[valueTwo]& commandTwo& . . . .

For purposes of clarity, requests within the examples may be separated into several lines in this specification.

Now returning to the simple image-scaling example above, a representation of a real system request could be:

```
source=url[http://www.liquidpixels.net/images/cat.jpg]&
scale=geometry[200×200]&
sink
```

From the above, the three commands, source, scale, and sink, together in a single request can be easily seen.

Figure 4:
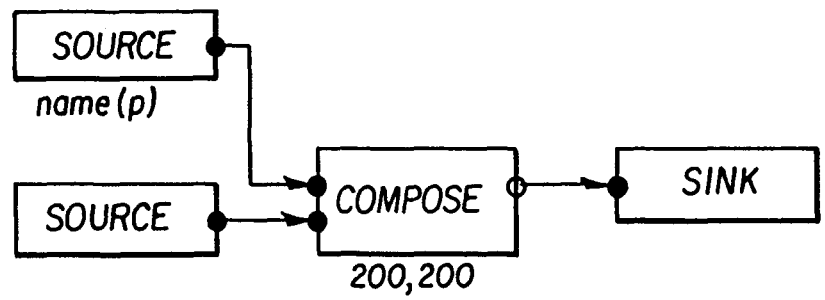
FIG. 4 is a schematic block diagram illustrating a multiple image chain.

Many requests will need to perform processing on more than one image. Yet the image chain representation becomes no more complex. In this example, one image is composed with another—the secondary image is blended, or layered, with the first at the location specified in the chain. The chain is graphically shown in FIG. 4. Since requests are represented as a sequence of commands, the system must use references to other commands to describe a bifurcated chain. The image chain above could be created by a request as follows:

```
source=url[http://www.liquidpixels.net/images/penguin.gif],name[p]&
source=url[http://www.liquidpixels.net/images/truff.jpg]&
composite=compose[Over],image[p],x[200],y[100]&
sink
```

There are two source commands in this example, with the first one additionally specifying a name argument with the value of 'p'. The additional argument tells the dynamic imaging server to take a penguin.gif image and add it to the pool as an image named 'p'. The second source command does not specify a name—the image is added to the pool as the current image, or '_'.

The composite transform operator requires a composition type specified by the compose argument and the name of an image in the pool to compose with the current image, specified by the image argument. The optional x and y arguments define an offset for the composition. Complete details of all preferred commands and their arguments are provided in the Appendix under "Base Command Set", at 73. The resulting composite image is shown in that attached Appendix, at page 6, Appendix FIG. 9, wherein the image of a penguin is placed over the image of a cat.

As a further example, consider now a small change to the previous example and illustrated by the following.

```
source=url[http://www.liquidpixels.net/images/truff.jpg],name[cat]&
source=url[http://www.liquidpixels.net/images/penguin.gif],name[p]&
select=name[cat]&
composite=compose[Over],image[p],x[200],y[200]&
sink
```

There are two differences in this modified example. First, the order of the source commands has been reversed, and both source commands specify image names. Second, there is a new command: select, used to make one of the images in the pool the current image. Functionally, this example is no different from the previous, but it can be easier to understand, since the 'current image' is no longer an inferred assignment.

As noted earlier, system assets can be acquired from many sources. The source of an asset is specified as a uri, with the http://, shttp://, ftp://, gopher:, and file: method types supported. The system and method may be readily expanded to include additional types. For the common network based methods, the asset is retrieved from the location specified by the URI to the dynamic imaging server where they are stored and managed by intelligent caching system. If the original image is altered, it will be re-transferred to the dynamic imaging service, otherwise, once the image is managed, it is not re-transferred unnecessarily. Assets may be added to and managed within the asset pool as discussed in the Appendix under "Resident Assets", at 46.

Vector formats allow for limitless scaling and rotation of imagery without the pixel re-sampling and resulting reduction of quality otherwise necessary. Images can be acquired in an ever-growing list of file formats, including formats that do not represent images as pixels, such as PostScript™, Encapsulated PostScript (EPS) or Simple Vector Graphics (SVG).

Certain situations will warrant the introduction of a new (possibly blank or patterned) image into the image chain. Perhaps a transparent spacer image is needed, or a background on to which text will be drawn. The blank command adds a blank image creation operator to the image chain. The blank command is used to add an operator to the image chain that creates a new solid image in the image pool:

blank=color[red],width[100],height[30]&sink

The new image can be created in any color desired, with many standard colors available by name. A complete list of named colors and the format for specifying custom colors is in the above-referenced Appendix, under "Color Definitions", at 173.

It should be noted that there is a difference between a macro command and a stored chain. Macro commands are executable computer code designed to perform complex, and often custom, operations during image chain creation. Stored chains, on the other hand, allow users to store often used request fragments for simple re-use later.

In the present system, image chains can be stored to disk and can be retrieved from disk or any network accessible location. The ability to store image chains—as portions or complete chains—allows users to amass a library of imaging functions which can be assembled later to perform imaging tasks. Coupled with the use of esoteric metadata and the set command, stored chains can behave as functions, allowing simple URLs to achieve powerful results.

Figure 5:
FIG. 5 illustrates a graphic tab to be generated in accordance with the present invention.
Figure 6:
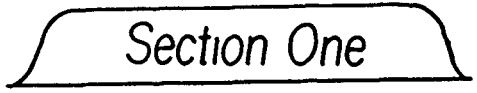
FIG. 6 illustrates the customization of the graphic tab in FIG. 5 with text data.

As one example, suppose one wished to adorn a set of web pages with section tabs similar to the one illustrated in FIG. 5. With a graphic for the image tag created as an eps file, the following image chain could be used to create a section tab with a section name as shown in FIG. 6.

```
source=url[file:tab.eps]&
annotate=font[Arial
Roman],pointsize[9],text[Section+One],gravity[Center],fill[black]&
sink=format[GIF]
```

Accordingly, with this simple image chain, section tab images can be easily created for any area of the web site, without needing to create them ahead of time.

Since stored chains are referenced by uri just as any asset, they may be stored within the resident asset pool or any network-accessible web of ftp server. With stored chains, however, this repetitive process can be made simpler. By replacing the text argument in the annotate command with a reference to global esoteric metadata, a portion of this image chain becomes a reusable function stored on the dynamic imaging server. It should be noted that the sink command was omitted from the request.

```
source=url[file:tab.eps]& annotate=font[Arial-Roman],pointsize[9],
text[global.section],gravity[Center],fill[black]
```

Image chain fragments can be stored on any server in a file, and can be retrieved as part of a request by using a load command. The set command can be used to assign values to global metadata fields within stored fragments. If the image chain fragment above was stored on a web server http://www.domain.com in the file /chains/tab.chain, then the following image commands could be used to create a tab graphic resulting in a customized tab image:

```
set=key[section],value[Section+One]&
load=url[http://www.domain.com/chains/tab.chain]&
sink
```

System assets—images, fonts, stored chains—can be retrieved from any valid url. The system supports the file: method within these urls, indicating that the asset should be retrieved from the system resident asset pool. The manipulation of the assets pool will now be described in greater detail.

The system's asset pool is divided into three distinct sections with each matching a corresponding type of data and therefore also matching a class of commands. The source command looks to the art asset pool; commands like annotate, text, mftext, and textcurve look to the fonts asset pool; and the load command looks to the chains asset pool. Additionally, the addprofile command looks to the art asset pool for icc color profiles.

When several dynamic image servers are installed as a cluster, each slave server accesses a synchronized copy of the master's resident asset pools, providing unified access to assets without any reduction in performance. Synchronization occurs on a regular basis, determined during configuration and can also be performed manually at any time. Additional information regarding the resident asset pools, manipulation capabilities, and cluster synchronization can be found in the Appendix under "Resident Assets", at 46.

System commands may contain arbitrary mathematical expressions which will be evaluated when the image chain is created from the request. Expressions are enclosed by parenthesis '(' and ')', and may contain references to image metadata fields. Expressions are an important element of the system's flexibility. They permit image manipulations to be constructed in situations where certain aspects of the source image or the necessary target are not known, or when metacommands are used to make decisions during rendering. Simple expressions are useful to increase clarity within some operation. For example, referring back to the composite example to position the penguin at the center of the underlying cat image, it is necessary to know the size of the cat image, which is information that is not available. However, expressions and image metadata can be used to determine the size.

```
source=url[http://www.liquidpixels.net/images/penguin.gif], name[p]&
source=url[http://www.liquidpixels.net/images/truff.jpg]&
composite=compose[Over],image[p],x[(_.width/2)],y[(_.height/2)]&
sink
```

It should be noted that the image specified in the second source command above, while not explicitly named, can still be identified by the current image name '_'. The identified image metadata width and height are each used within small expressions to determine the center of the current image (named '_').

Certain characters may not be permitted within a request of a specific form. For example, http requests, present a limited character set due to the use of several characters by the protocol to indicate special meaning. In all cases, however, encoding techniques specific to the representation can be used to overcome this limitation Several Metacommands are also preferably available that perform decision making operations such as if-then, string matching, or time and date determination. These Metacommands all perform by manipulating global metadata, and the results of their operation can be used within expressions. For example, in a more complex case:

```
blank=width[600],height[60],name[bg]&
annotate=text[Only],font[Arial-Bold],pointsize[22],fill[black],
y[35],x[10]&
annotate=text[days+left+till+Christmas],font[Arial-Bold],pointsize[22],
fill[black],y[35],x[150]&
countdown=target[12/25/2001],key[days]&
annotate=text[global.days],font[Dominican],pointsize[36],fill[red],
y[40],x[82]& optimize&
sink=format[gif]
```

In this example, the number of days remaining until Christmas 2001 is determined by the countdown metacommand supplied as party of the system. The resulting number is placed in the global metadata in a field named days, specified by the key argument in the countdown command. Each time this request is processed, the operators that result may contain different values, based on the number of days remaining. This information is used by the annotate command later in the request to draw a custom message on the image.

Sometimes there are situations where a command within a request should only be executed if a certain criteria is met. Perhaps an image should only be reduced if it exceeds a certain size. Or, perhaps, only images in cmyk should only be converted to rgb. The system's conditional execution of commands allows for command processing to occur only if a criteria is valid.

```
source=url[http://www.liquidpixels.net/images/Spain.jpg],name[image]&
scale=size[500]&
addprofile=url[file:profiles/sRGB.icm],if[('image.colorspace' ne
'RGB')]& sink
```

Any system command may contain an additional special argument, 'if'. When the if argument is present for a command, the value of the if argument is evaluated, and the command will be skipped during processing if the value is numerically zero or blank.

As already mentioned, images have two components: a visible component, represented as pixels, vector information, or instructions, and a non-visible component called metadata. Metadata comes in two forms, image-specific metadata, representing physical aspects of an image (height, width, color depth, format, etc.) and logical aspects of an image (cached, name, etc.) and esoteric metadata, representing any additional information associated with an image by the user. Image-specific metadata is inherent to the image, it can not be changed explicitly, while esoteric metadata can be arbitrarily manipulated as needed. Esoteric metadata can be manipulated by the attribute command. Both types of metadata are available to system commands within a request. There is no distinction made between image and esoteric metadata within a request.

Metadata is accessed by image pool name, followed by a dot '.' and the name of the metadata field desired. For example, the string "cat.width" could be used within a command to determine the width of an image named cat. The current image can also be queried for metadata, even when it is not explicitly named by using an underscore '_' as the image name (_.width).

Beyond metadata associated with an image, there is also metadata associated with a request. This metadata, solely esoteric, can be used to pass information between commands in a request, much as variables are used in programming languages. Request-centric metadata is known as Global metadata, and is accessed via a special image name global. Esoteric metadata can be set globally or specifically for an image by using the set metacommand, or by certain other metacommands and macros that may make decisions or calculations earlier in a request.

Two forms of image-specific metadata are detected and extracted by the system for use in image chains: iptc metadata and exif metadata. The International Press Telecommunications Council, or IPTC, defines a format for the exchange of metadata in news content including photographs. Many desktop imaging applications allow you to add iptc metadata to your images, or view any data already in place. The iptc metadata fields are listed in "IPTC Metadata" on page 193 of the Appendix. The exif, or Exchangeable Image File, defines a common format for image interchange in use by most digital cameras on the market today. Along with the image capture, devices supporting exif will populate the exif metadata fields with camera- and possibly location-specific information known at the time of capture. The exif metadata fields are listed in the Appendix under "EXIF Metadata", at 196. Both exif and iptc metadata can appear in an image together.

Non-Imaging commands are commands which, when executed, result in the addition of zero or more new operators added to the image chain. They differ from basic commands in that they do not perform imaging operations themselves. Rather, they are useful to make decisions, fetch data from an external source, perform repetitive commands, and to reduce complex, yet often-repeated imaging operations into a simple single command. Non-imaging commands can be separated into two categories: metacommands and macros. Metacommands are commands intended to manipulate metadata. Macros appears as any other command within a request, but may be designed to perform complex computations, database access, or other computations as precursor steps to adding zero or more operations to the image chain, or setting esoteric metadata. A macro may, for example, be developed to query a database of product information and set esoteric metadata to the current price. This metadata could then be used later in the request to image sale information on the image, or as the basis for conditional execution of a command.

Certain macros are simple conveniences. For example, the most common use for the system may be to create an image containing styled text rendered in an attractive typeface can be simplified via a macro. Without a macro three steps are required: first, determine the size of the text to be rendered, in pixels; second, create a new blank image of that (or slightly larger) size; and third, render the text onto the new blank image. The text macro does just this: it calculates the bounding box for the text to be rendered, and then adds two new operators to the image chain: a blank operator and an annotate operator.

In most environments, there is no need to restrict access to the dynamic imaging server or a cluster of servers. Some environments, however, will require certain restrictions to be placed on access to the server. There are two mechanisms by which access to a dynamic image server are preferably restricted: referring host, and keyed requests.

The referring host method is most applicable to websites using the system for imaging within their own environments or a limited number of external environments. It is not a desirable mechanism for securing access within the arena of HTML e-mail. When a web browser makes a request to a server, it sends with the request information describing the HTML resource that referred the request. When following a link from one HTML page to another, for example, the browser informs the web server of the URL from which the second page is accessed. When a browser makes a request for an image, the web browser will inform the server the URL of the page containing the image tag. It is this information that the system uses to restrict use of the dynamic imaging server by alien sites. The system is presented with a list of server names (or URLs) for which requests are permitted. Once the list is complete, and host based security is enabled, any attempts to access the server via an image tag served by a server not listed will not be permitted. Operation is transparent when the request is made from a web browser, even under JavaScript control.

When keyed requests are made from a non-browser environment—html e-mail, a Java applet, an application—the referrer information used in host based security is not present. In this case, an additional command must be added to the chain containing a key, unlocking the system for that request. A unique key is created for each request to be made; keys are based on the image chain itself, and a 'secret' known to the system operator.

Figure 7:
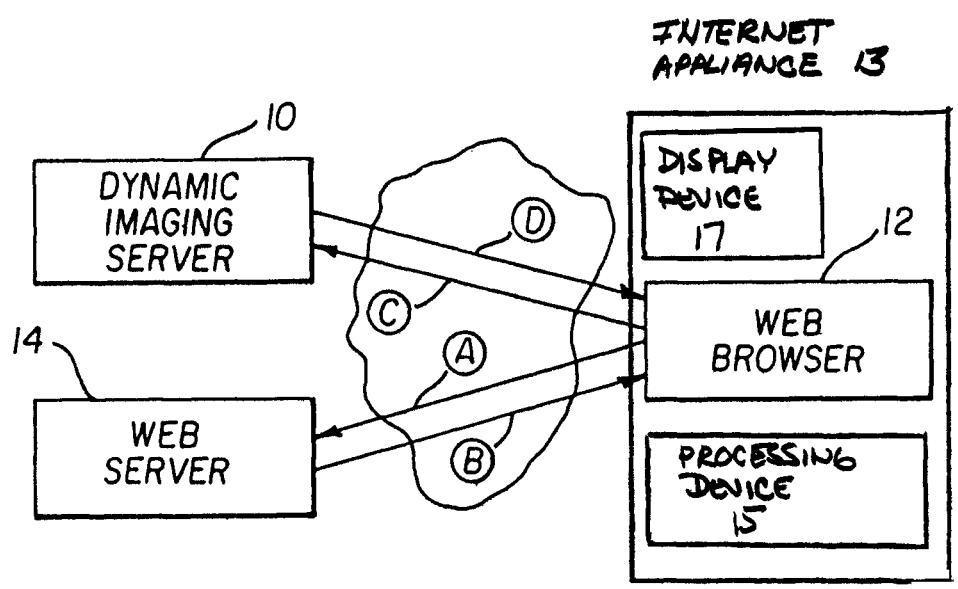
FIG. 7 is a schematic block diagram illustrating the use of a dynamic imaging server in an Internet application.

The system preferably maintains two separate cache systems: an asset cache, for source images, fonts, profiles, and stored chains; and a render cache, for rendered images. Both caches perform the same basic function, to keep recently accessed data near-by such that subsequent accesses are as rapid as possible. When any asset is requested via url in a command such as source or annotate, the asset is retrieved from the location specified and stored within the asset cache. Subsequent requests for the same asset will use this cached copy, saving the overhead of the network retrieval. In clustered environments, the asset cache is automatically synchronized to appear as a single, unified, transparent cache. The render cache is used to accelerate repeat requests for a chain, serving the cached result rather than re-render the image. The decision to return a cached image is based on the request; requests must match exactly to cause a cached Referring now to FIG. 7, a schematic block diagram is shown illustrating the use of a dynamic imaging server 10 in an Internet application of the present invention. In a conventional Web operation, a World Wide Web browser 12 contacts a web server 14 via a communication network 16, such as the Internet, requesting an HTML resource or page that is available on the web server 14. The World Wide Web browser 12 is installed on a network appliance 13 (such as a personal computer, a personal-digital-assistant (PDA) device, a cellular telephone or any other physical device capable of interacting with the Internet) that includes a processor device 15 that runs the browser 12 and a display device 17 that displays a page generated by the browser 12 to a user in response to a request. The request is illustrated in the drawing by arrow A. The page, composed in HTML, includes image tags containing HREFs pointing to the dynamic imaging server 10 and an image chain is returned to the browser 12 as illustrated by arrow B. The browser 12 parses the HTML, and makes subsequent requests back via the network 16 to obtain data for all images referred to by the image tags. When a tag referencing the dynamic imaging server 10 is requested, an HTTP request is sent via the network 16 to the dynamic imaging server 10 where it is parsed into a job as illustrated by arrow C. The job is processed and the newly created custom image is returned via HTTP by the dynamic imaging server 10 via the network 16 to the requesting browser 12 for display for display on the display device 17 of the network appliance 13.

Figure 8:
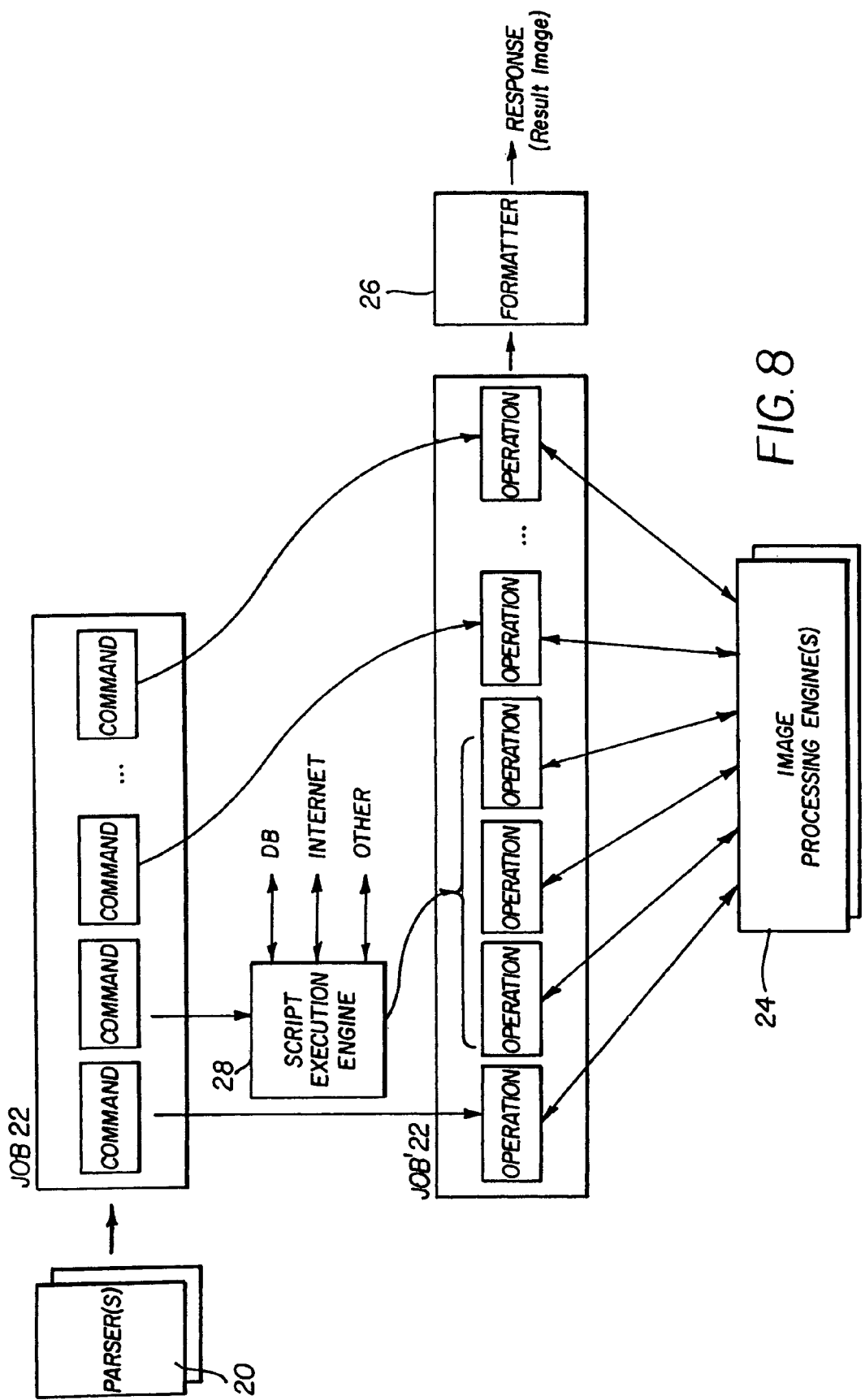
FIG. 8 is a functional block diagram of the dynamic imaging server illustrated in FIG. 7.

FIG. 8 is a functional block diagram illustrating the dynamic image server 10. The dynamic imaging server 10 preferably includes a parser 20 that parses the incoming request into a job 22 having one or more associated commands as previously described above. An existing URI parser can be easily augmented with additional parsers for XML and other types of requests. Accordingly, the parsing and command creation process is extensible such that new functionality can be added to the system over time. The job 22 is then executed one command at a time to perform various operations by a job processor. The performance of the operations is shown for purposes of illustration as job 22'. The operations may require the use of one or more imaging engines 24 contained with the dynamic imaging server 10 in order to manipulate or create the image as described in the request.

As one example, a first command may require the dynamic imaging server to obtain a source image from a tertiary web server at a specified URL. The dynamic imaging server 10 makes this request, and uses the returned image as the starting point for the image processing process. A second command may then require the dynamic imaging server 10 to scale the image to 50% of its original size, which the dynamic imaging server 10 accomplishes by utilizing an appropriate image processing engine. Finally, a further command may require the dynamic imaging server 10 to format the new image into a specific image format, such as a JPEG image, which the dynamic imaging server 10 accomplishes using a formatter 26.

The dynamic imaging server 10 also preferably includes a script execution engine 28 that can execute arbitrary code during a job execution. The command may require, for example, that information be retrieved from a remote site—like a stock quotation—or that another image element—for example a grid pattern—be generated for insertion into the image to be created. The script execution engine 28 executes these types of instructions to obtain the necessary data to be inserted into the image.

Figure 9:
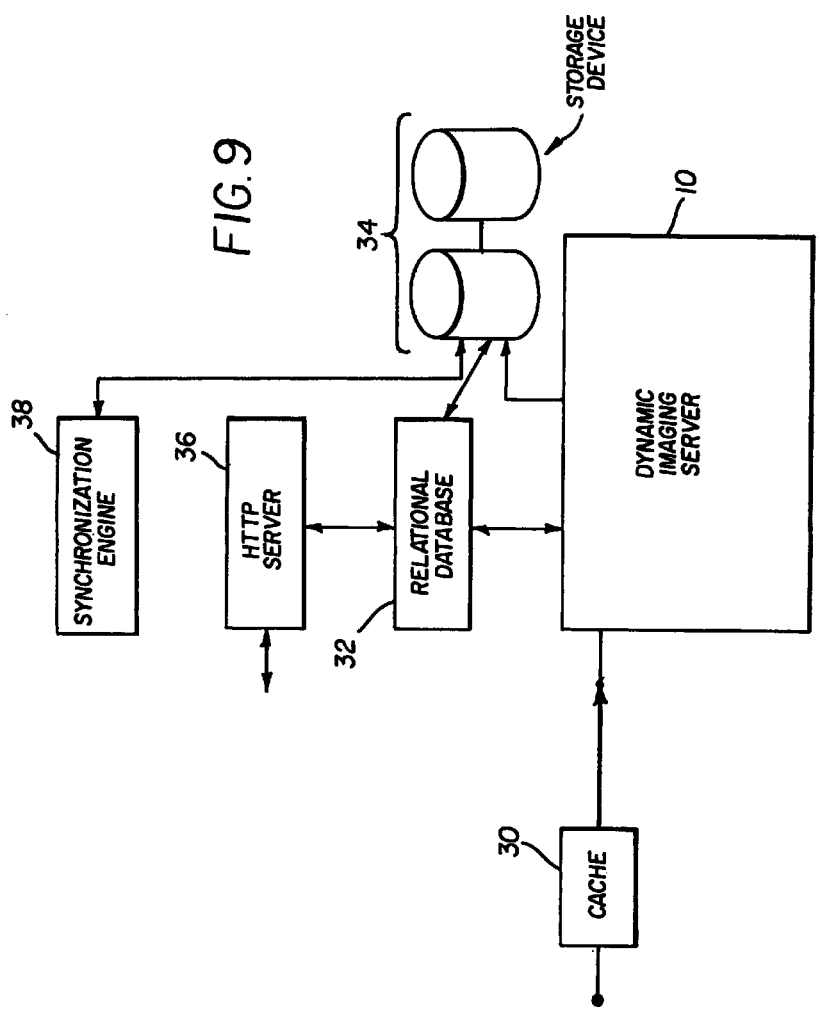
FIG. 9 illustrates a single node of a dynamic imaging system in accordance with the invention.

Referring now to FIG. 9, a system overview illustrating the implementation of the dynamic imaging server 10 into an overall dynamic imaging system in the form of a basic node. The basic node includes the dynamic imaging server 10 coupled to an input request cache 30, a relational database 32, and a storage device 34. The input request cache 30 is used to cache requests, wherein a subsequent request for an image that has already been created need not be processed by the dynamic imaging server 10. Instead, the image can be retrieved directly from the storage. New requests are forwarded to the dynamic imaging server 10 for processing. During the process of the request, the dynamic imaging server 10 may need to acquire a particular asset or other information. The dynamic imaging server 10 can query the relational database 32 to determine the location and availability of the asset. If the asset is not maintained on the local storage device 34, an HTTP server 36 can be utilized to retrieve the asset. The HTTP server 36 can also be utilized to allow for configuring of the dynamic imaging server 10 as explained in the aforementioned Appendix. Finally, a synchronization engine 38 is provided to synchronize transfer of files from other sources to and from the local storage device 34.

Figure 10:
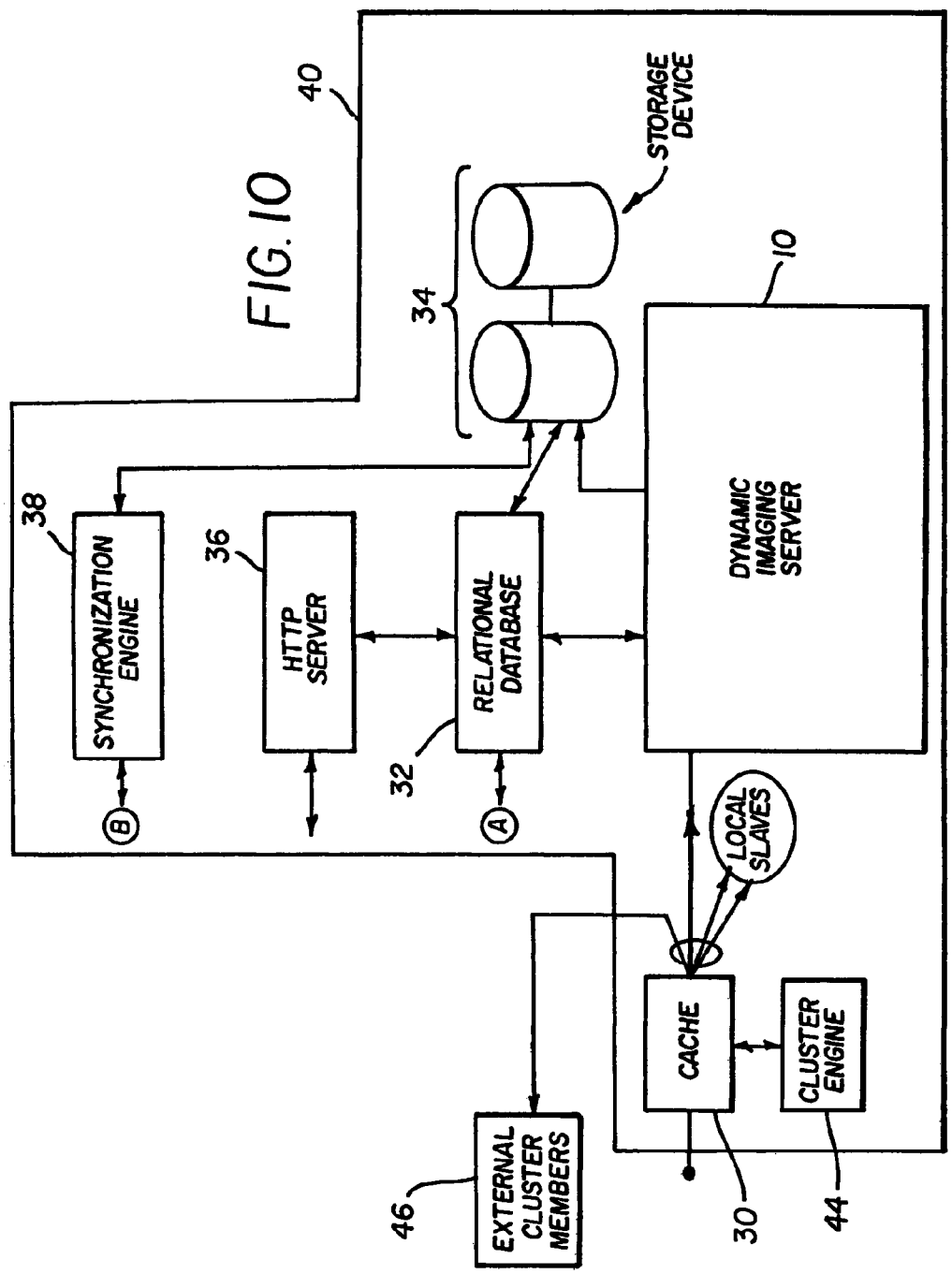
FIG. 10 illustrates a cluster master for a dynamic imaging system in accordance with the invention.
Figure 11:
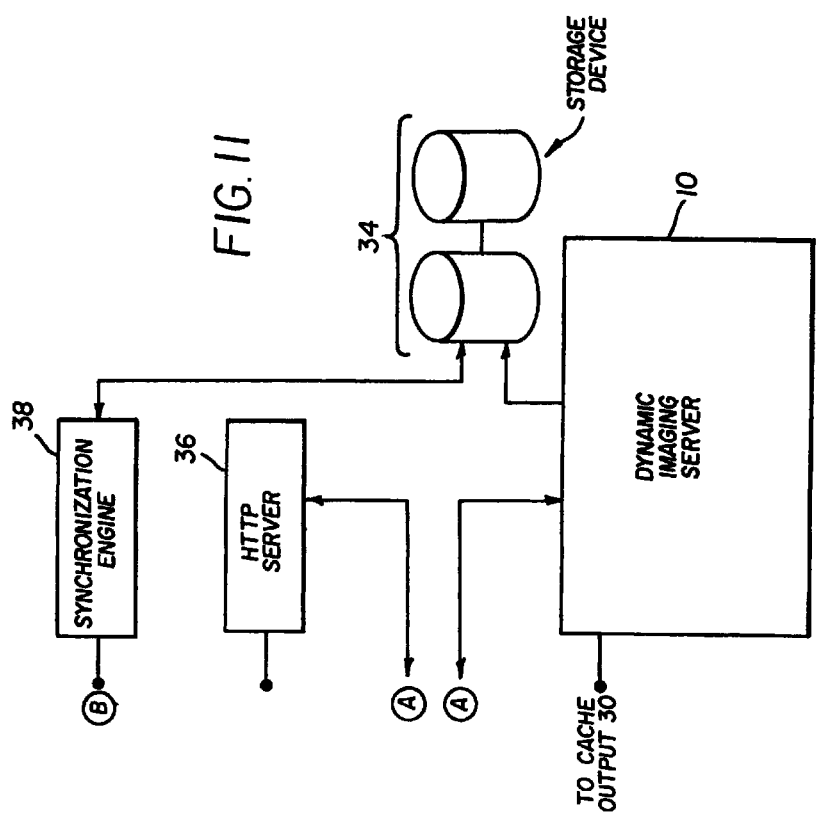
FIG. 11 illustrates a cluster slave for a dynamic imaging system in accordance with the invention.

The architecture of the dynamic imaging system provides a great deal of flexibility in coupling multiple dynamic image servers 10 together depending on the requirements of a particular application. Multiple dynamic imaging servers 10, for example, can be linked together to form a cluster. FIG. 10, for example, illustrates a cluster master 40 that includes a cluster engine 44 in addition to the same elements of the basic node discussed above, while FIG. 11 illustrates a cluster slave 42 that is coupled to the cluster master 40. The cluster slave 42 also includes the elements of the basic node set forth above, with the exception of the relational database 34. The cluster engine 44 monitors the requests and determines which dynamic imaging server 10 within the cluster is best suited to handle the particular request. Accordingly, the cluster engine 44 acts to direct the flow of requests to the device most suited to handle that particular request.

As also noted in FIG. 10, the requests may be directed to external cluster members 46. In other words, each individual cluster may have at least one master and one or more slaves, and each individual cluster can be linked to another external cluster. The ability to link clusters together provides a great deal of application flexibility. In an electronic commerce application, for example, a user may have a cluster including several slave devices that are generally sufficient to meet the user's requirements during most periods of the year. In peak periods, however, the user may need additional processing capability. Instead of expanding the number of devices in its own cluster, the user can utilize the resources of other external clusters. The external clusters could be the user's own external cluster located at a different geographic location or—in a preferred application—may be the cluster of a third party provider that leases or sells excess processing capability to the user. Providing this overflow processing capability permits the user to avoid the expense of purchasing and maintaining equipment that is not needed for most of the year, while maintaining sufficient capacity during peak periods.

The factors used by the cluster engine 40 to determine request flow may include a number of parameters and is generally dependent on the particular application. As just one simple example, the cluster engine 40 determines which device in the cluster is currently idle and directs the next request to the idle device. It will be readily appreciated by those skilled in the art that the actual parameters to be utilized will be application specific but could include: geographic location of clusters; cluster processing loads; cluster data transfer capabilities; time variables; and the nature of the request to be processed.

Figure 12:
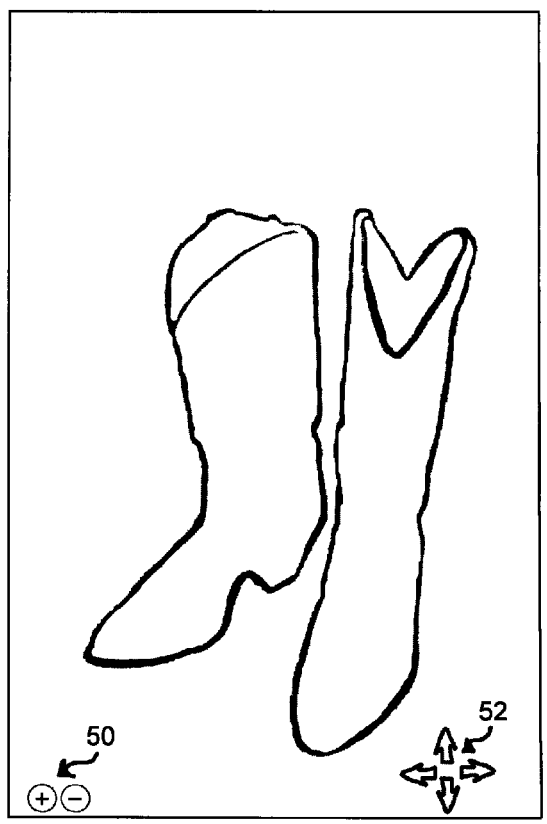
FIG. 12 illustrates a dynamically generated image displayed on a display device with selectable zoom and pan icons.

The utilization of the dynamic imaging server 10 to provide a ZAP feature will now be described in greater detail. An example of an image of a pair of boots displayed to an end user via the display device 17 is shown in FIG. 12. The original image is preferably a high resolution image capable of illustrating a high degree of detail. It is not necessary, however, to initially provide a high resolution image to the end user unless the user specifically desires to inspect the product for purchase. The transmission of the original high resolution image, when not specifically required, would unnecessarily take up time, bandwidth and memory resources. Accordingly, it is preferable that the base image displayed to the end user for the end user's initial consideration is a scaled version of the original high resolution image. The base image can easily fit within the available image display real estate or a viewport provided on a page displayed by the browser 12 on the display device 17, while showing the full image of the product at a resolution lower than the resolution used to capture the original image.

Should the end user decide to inspect the product for purchase, however, it is necessary to provide a ZAP feature that enables the end user to quickly recover the full detail of the original high resolution image. In the present system, this is preferably accomplished by having the dynamic imaging server 10 perform an auto-tiling operation on the original image upon receipt of a ZAP command. The auto-tiling operation generates a plurality of different image tile layers corresponding to different resolutions of the original high resolution image. The image tile layers can be accessed by the dynamic imaging server 10 in accordance with the ZAP feature to enable different levels of detailed to be easily and quickly displayed.

Figure 13:
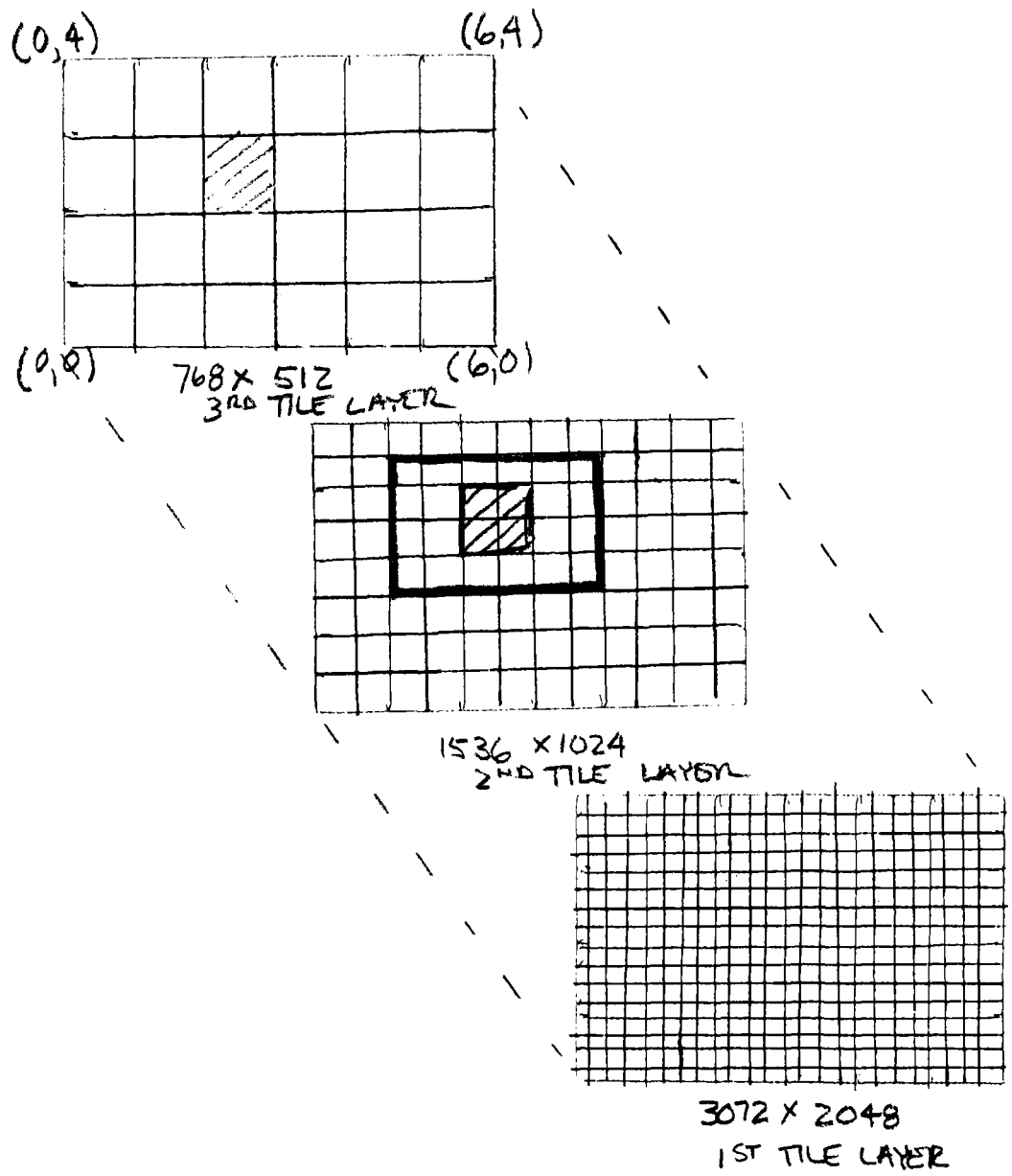
FIG. 13 illustrates a plurality of tile layers generated by the dynamic imaging server.

Specifically, the dynamic imaging server 10 generates a plurality of image tile layers corresponding to the original high resolution image in response to a ZAP command. As described above, each image tile layer is successively scaled to a lower resolution than the original high resolution image. FIG. 13, for example, illustrates a simple example in which an original image, having a resolution of 3072×2048 pixels, is defined as a first tile layer including a plurality of 128×128 tiles by the dynamic imaging server 10 in response to a ZAP command. The dynamic imaging server 10 then scales the original image by 50% to generate a second tile layer having a resolution of 1536×1024 pixels including a plurality of 128×128 tiles. The process continues, and the second layer is then scaled by 50% to generate a third tile layer having a resolution of 768×512 pixels including a plurality of 128×128 tiles.

As shown in FIG. 12, the base image is preferably displayed to the user with plus and minus zoom icons 50 as well as directional pan icons 52 that are selectable with a user interface, such as a computer mouse, provided in the network appliance 13. Upon selecting one of the zoom icons 50, a ZAP image requests generated and sent to the dynamic imaging server 10. For example, a request is generated such as:

http://lpi.liquifire.com/lpi?source=url[file:Site/Boots.tif] & Zap

The request includes the location of the "Boots.tif" image and instructs the dynamic imaging server 10 to retrieve the image and perform the "Zap" command on the returned image. The Zap command is preferably formatted as:

Zap=layer[50], size [128], x[2], y[5] & sink

In response to the Zap command, the dynamic imaging server 10 performs the auto-tiling process to generate and return an image associated with a specified tile layer (layer[50]) having a specified tile size (size[128]) and located at a specific X-Y coordinate position (x[2],y[5]) within the tile layer.

Referring to FIG. 13, as a simple example, assume that a base image viewed by the user on the display device 17 includes the third tile layer. The user selects a specific area of the image to be enlarged by the zoom function and centered by the pan function, for example, the tile located at position x[3], y[3] (cross-hatched in FIG. 13) is selected, and the dynamic imaging server 10 retrieves tiles corresponding to the same location from a higher resolution layer based on the amount of zoom to be performed. Since the image tile sizes are the same between image tile layers, one selected tile in the third layer will have four corresponding tiles in the second layer. Further, since the size of the viewport is the same as the third tile level, namely 768×512 pixels, it is possible to return a total of twenty-four tiles from the second tile layer as a result of the zoom function for display from the second tile layer. For example, in order to center the selected area within the viewport, the image tiles represented by the dark rectangle in FIG. 13 are returned by the dynamic imaging server 10 for display on the display device 17.

The above described ZAP features is performed in conjunction with other dynamic imaging features provided by the dynamic imaging server 10. For example, it might be desirable to personalize the boots shown in FIG. 12 with a particular embroidery pattern. Using the present system, the user can select the desired pattern from a plurality of available embroidery patterns images, and the dynamic imaging server 10 will return the dynamically generated image to the user by overlaying the selected embroidery pattern over a basic image of the boots. The combined image will be referred to as a "dynamically generated image", while the feature added to the basic image of the boots—in this case the embroidery pattern—will be referred to as a "dynamic image feature". The user may then wish to zoom in on the portion of the image containing the selected embroidered pattern for a better view, using the zoom icons 50 and pan icons 52 provided in the viewport illustrated in FIG. 12. Upon receipt of the ZAP command, the dynamic imaging server 10 performs the above-described auto-tiling process on the dynamically generated image, thereby incorporating the dynamic image feature, i.e. the embroidery pattern in this case, into the generated image tile layers.

Upon closer inspection, the user may decide to replace the initially selected pattern with a different pattern. In such a case, it is not necessary for the dynamic imaging server 10 to perform the auto-tiling process on the entire dynamically generated image, but instead, the auto-tiling can be limited to the specific image tiles impacted by the change of the embroidered pattern. In other words, those image tiles containing the dynamic image feature, in this case the embroidery pattern, are altered in the original image contained in the first image tile layer, and only those image tiles are subjected to the auto-tiling process to replace corresponding tiles in the subsequent image tile layers. Accordingly, the system is capable of rapidly responding to various image requests as the entire original dynamically generated image doesn't have to be subjected to the auto-tiling process every time a dynamic imaging feature is changed. Further, the image tiles can be stored in the cache 30 to provide to a rapid response to subsequent requests.

As describe above, by performing auto-tiling after a dynamic generated image is created, it is possible to incorporate dynamic image features, such as "hotspots", within the ZAP feature. Hotspots, for example, are preferably regions of an image defined as coordinate-based shape, wherein the regions may be polygons, represented as series of coordinate-pairs, or as bezier curves, represented as a series of handle locations, and wherein the regions may encompass a specific item or area of interest presented within an image. Each region or hotspot may have one or more corresponding actions. The selection of one of the actions for a region is determined by the user interface, for example, by a "click" on the region with a computer mouse or the selection of a menu item (for multiple actions per region) visually corresponding to the region. The actions may include, but are not limited to, instructing the viewer to change a viewport to a pre-defined location, changing the image being viewed, recording the selection of the region, reporting back to a centralized server or navigating a browser to a URL.

Figure 14:
FIG. 14 illustrates the display of a dynamically generated image including a hotspot.
Figure 15:
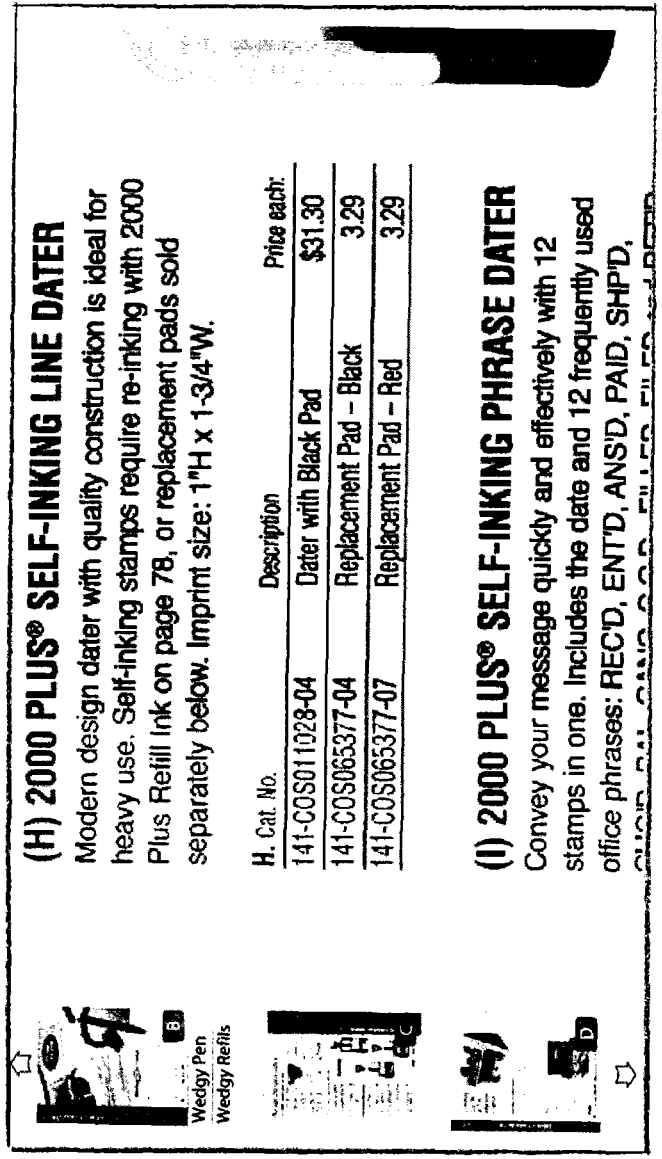
FIG. 15 illustrates the display of a zoomed portion of the image of FIG. 14 in response to the selection of the hotspot.

FIG. 14, for example, illustrates the display of a catalog page containing images of a number of hand stamps 54 and text data 56 associated with each of the illustrated hand stamps 54. Each image area associated with each of the illustrated hand stamps 54 is defined as a hotspot. Placement of an indicating device, such as a cursor, over the image of a hand stamp (for example hand stamp (h)) by a user causes the dynamic imaging server 10 to perform commands associated with the hotspot. In this case, both a zoom and pan operation are performed, so that the text data associated with the viewport zooms in on the catalog page and pans over to the text associated with the handstamp (h) as shown in FIG. 15. As illustrated in FIG. 14, it is also preferable to provide a visual indicator to the user when the cursor moves over a hotspot, for example, by highlighting the hotspot image area in a different color as shown, with a border or through any other form of visual or audible indicator.

As a user interacts with the ZAP feature, the user may zoom-in multiple times, pan the image at a given of detail, and zoom-out. As the user navigates the image, each zoom-in operation reduces the area encompassed by the viewport, and each zoom-out operation increases the area encompassed by the viewport. Panning operations move the viewport without changing its size. Information related to the user's use of the ZAP feature can be utilized to determine which regions of a particular image are of interest to groups of user's or to an individual user.

The present system tracks this information, namely, as the viewport changes, the size and location of the viewport is recorded and subsequently conveyed back to a tracking device, thereby resulting in a list of viewport locations, the time of the viewport change, the type of change made to the viewport, etc., as well as an identifier for the user or session. As the collection of viewport coordinates increases, this information contains the areas of an image which are 'important' both to an individual user, and/or to various groups of users, depending on how and if user identification is handled using conventional identification methods such as "cookies". This "viewing-region-tracking" information can be particularly valuable as a marketing tool to determine which types of images and which objects within images generate the most interest to viewers, and can also be played back for future analysis of the user's entire viewing session.

Figure 16:
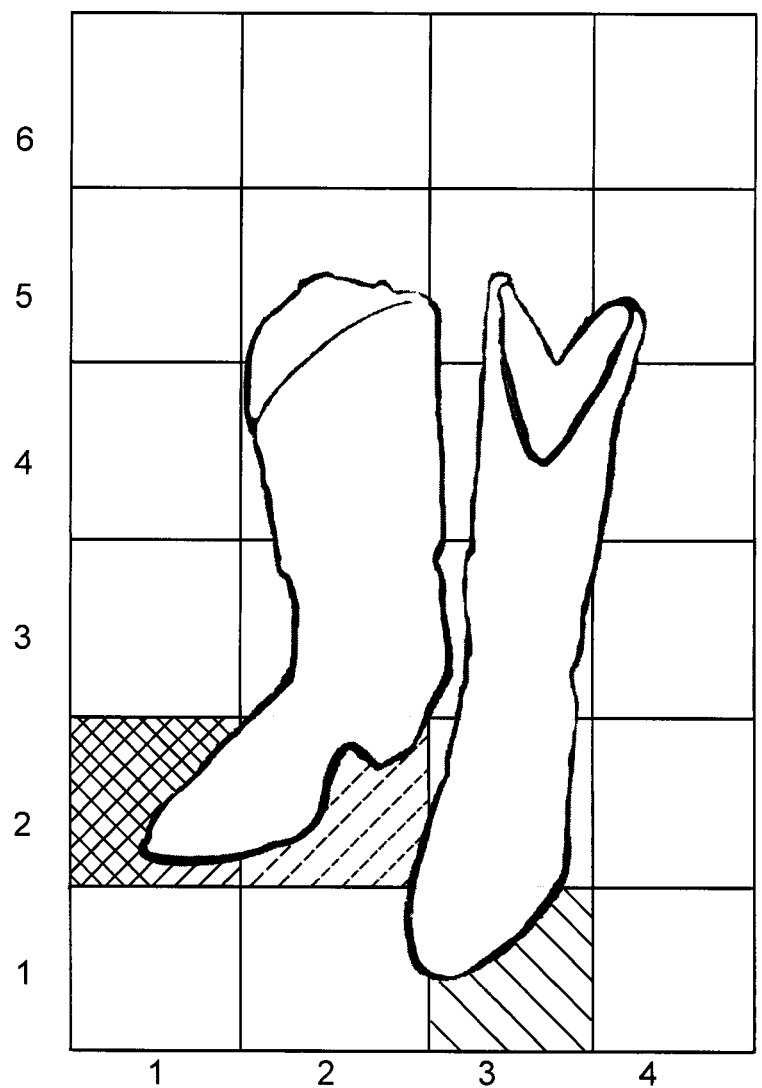
FIG. 16 illustrates a heat map generated in response to tracking information gathered by the dynamic imaging server.

For example, in operation, the dynamic imaging server 10 defines an original displayed image as a series of regularly sized tracking sections forming a grid along the entire image as illustrated in FIG. 16. The size of the tracking sections may be fixed, or they may grow and shrink based on how much viewport data is available. The tracking sections may also correspond to the individual tiles associated with each of the tile layers described above. As different tracking sections are selected by a user, each viewport record is recorded in a tracking database. The recorded viewpoint records can be used to darken the color of the grid cells that it contains (and partially darken the cells it partially contains, proportional to the amount of overlap) in order to generate a "heat map" of the areas on the image that were viewed. Further, color may be applied to the heat map to indicate various characteristics of the viewport or of the viewing session. For example, the selection of hotspots could result in color being applied to the grid rectangles where the click and/or viewport was located, so the original image is still viewable under the heat map, i.e., the heat map is preferably a semi-transparent overlay. In the illustrated example, the heat map is illustrated using various forms of cross-hatching, with the area of greatest interest (1,2) being cross-hatched by diagonal lines in two directions, the area of second greatest interest being cross-hatched with diagonal lines in a single direction, and an area of third greatest interest being cross-hatched with dashed lines.

As described above, the collected tracking information is supplied to a tracking device and stored for subsequent display and analysis by a user. The tracking device can be the dynamic imaging server 10, a web server 14 connected to the communication network, of any network appliance 13. In other words, the tracking device can be any device that can receive the tracking information from the dynamic imaging server 10 either in real time (as each data item is essentially generated) or through a batch transfer (for example, all tracking information related to a particular session is collected by the dynamic imaging server 10 and subsequently uploaded to the device serving as the tracking server). Various conventional statistical analysis processes can be applied to the tracking information in order to evaluate the tracking information in accordance with various applications.

The invention has been described with reference to certain preferred embodiments thereof. It will be understood, however, that modifications and variations are possible with the scope of the appended claims. For example, although the preferred embodiment includes a hotspot as a dynamic imagine feature, the dynamic imagine feature can be any operation, feature or element that is used to generating the dynamically generated image including scaling operation. Further, the zoom-and-pan feature and the tracking feature are mutually exclusive features. For example, the tracking feature can be implemented using any dynamically generated image without incorporating the use of ZAP. In such a case, the tracking information can still include information related to the location of interest to a user, but would not include information related to the ZAP commands.

What is claimed is:

1. A system that generates and transmits digital images to an end user over a communication network, the system comprising:

a network appliance including a display device and a user interface, including an indicating device, that allows a user to generate an image generation request and a zoom-and-pan command;

a dynamic imaging server that creates a dynamically generated image including a least one dynamic image feature in response to the image generation request and, modifies the dynamically generated image in response to the zoom-and-pan command to create a modified image;

wherein the dynamic imaging server includes a parser that receives the image generation request and interprets the image generation request into a set of individualized image generation operation commands that are executable to create or alter an image, a job processor that receives the set of individualized image generation operation commands from the parser and sequentially executes the set of individualized image generation operation commands in the form of a image generation job, a script execution engine that executes code during execution of the job by the job processor, at least one image processing engine that performs at least one image generation operation in response to at least one image generation command contained in the image generation job to generate processed image data corresponding to the image generation request, and a formatter that receives the processed image data from the image processing engine and formats the processed image data into the dynamically generated image in response to the image generation request;

wherein the dynamic imaging server generates a plurality of tile layers corresponding to the dynamically generated image in response to the zoom-and-pan command generated by the network appliance, each of the plurality of tile layers including a different image resolution and each of the tile layers being divided into a plurality of individual image tiles;

wherein the dynamic image feature included in the dynamically generated image comprises a hot spot such that placement of the indicating device within the hot spot causes the dynamic imaging server to perform commands associated with the hotspot including the zoom-and-pan command;

wherein the dynamic imaging server generates tracking information corresponding to movement of the indicating device with the dynamically generated image and further comprises a tracking device that receives the tracking information generated by the dynamic imaging server and generates a heat map that graphically illustrates areas of interest in the dynamically generated image corresponding to the tracking information.

2. The system as claimed in claim 1, wherein each of the tile layers comprises the same number of individual image tiles.

3. The system as claimed in claim 1, wherein the dynamic imaging server alters only individual image tiles incorporating the dynamic image feature, when the dynamic image feature is altered in response to an image request generated by the network appliance.

* * * * *